United States Patent [19]

Chum et al.

[11] Patent Number: 5,091,250
[45] Date of Patent: Feb. 25, 1992

[54] LIGHT STABLE POLYSTYRENE-POLYMETHYLMETHA-CRYLATE LAMINATE AND METHOD OF PREPARATION

[75] Inventors: Pak-Wing S. Chum, Lake Jackson, Tex.; Mark A. Barger, Midland, Mich.

[73] Assignee: The Dow Chemical Company, Midland, Mich.

[21] Appl. No.: 475,523

[22] Filed: Feb. 6, 1990

[51] Int. Cl.$^5$ .............................................. B32B 27/08
[52] U.S. Cl. .................................... 428/339; 428/520; 428/522
[58] Field of Search .................. 428/520, 522, 339

[56] References Cited

U.S. PATENT DOCUMENTS

| | | | |
|---|---|---|---|
| 3,959,432 | 5/1976 | Wiley | 264/171 |
| 4,100,237 | 7/1978 | Wiley | 264/40.6 |
| 4,101,702 | 7/1978 | Churchill et al. | 428/213 |
| 4,221,836 | 9/1980 | Rutledge et al. | 428/220 |
| 4,233,367 | 11/1980 | Ticknor et al. | 428/476.3 |
| 4,317,860 | 3/1982 | Strassel | 428/421 |
| 4,350,742 | 9/1982 | Hall et al. | 428/520 |
| 4,415,519 | 11/1983 | Strassel | 264/171 |
| 4,581,259 | 4/1986 | Rambaud | 427/350 |
| 4,661,303 | 4/1987 | Chum et al. | 264/171 |
| 4,678,713 | 7/1987 | Lancaster et al. | 428/421 |
| 4,731,213 | 3/1988 | Klepsch | 264/512 |
| 4,792,477 | 12/1988 | Ochiumi | 428/216 |

OTHER PUBLICATIONS

"Light Stable PS Sheet on the Way", Plastic World, Oct. 1982.

*Primary Examiner*—Edith L. Buffalow

[57] ABSTRACT

A light-stable, optically clear laminate construction and method of making it which utilizes inexpensive styrenic polymers is provided. The laminate formed exhibits strong interfacial adhesion without the need for additional glue or adhesive layers through the use of pendant functionalized hydroxyl groups incorporated into the styrenic polymer by copolymerization. These pendant hydroxyl groups react with active pendant ester groups on the other polymer layer in the laminate to form strong covalent interfacial bonds by heating the layers, preferably either in a compression molding step or during coextrusion of the layers.

9 Claims, 2 Drawing Sheets

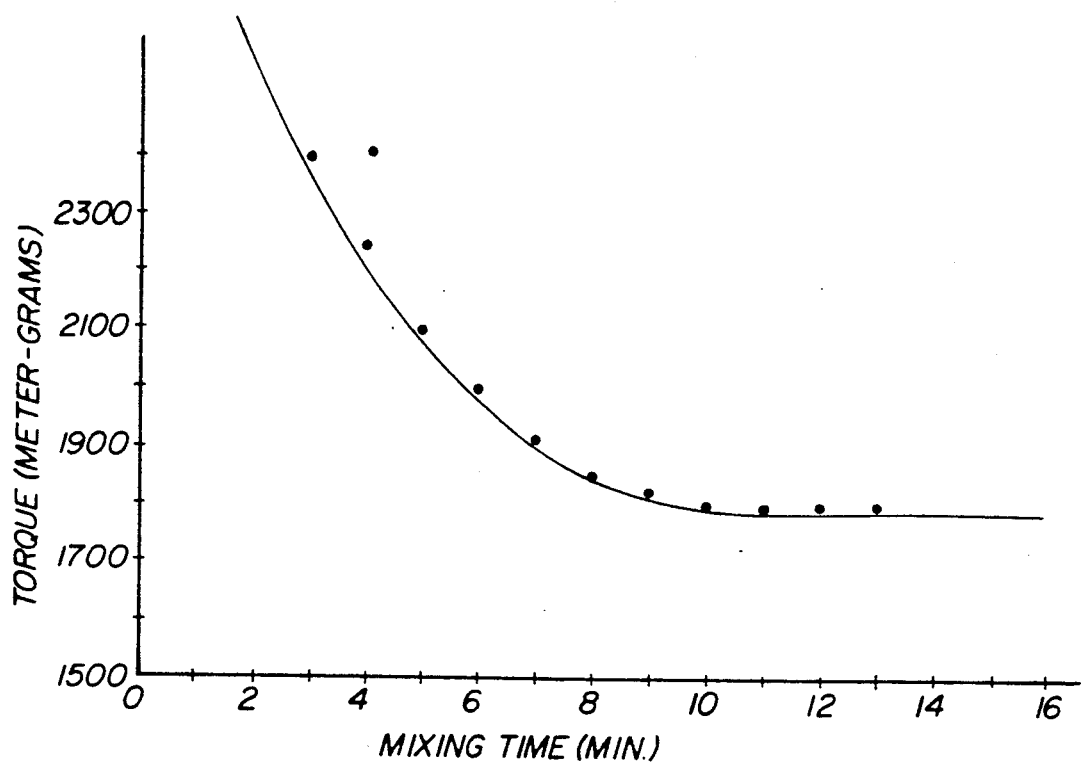
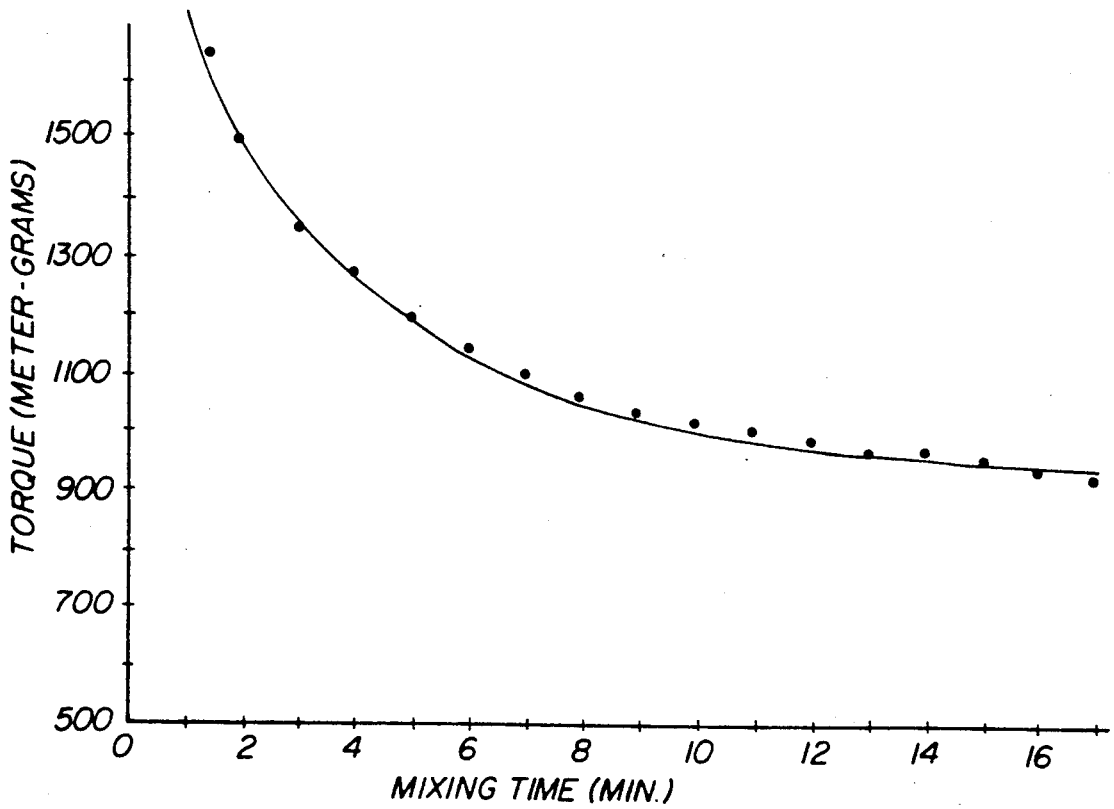

LIGHT STABLE POLYSTYRENE-POLYMETHYLMETHACRYLATE LAMINATE AND METHOD OF PREPARATION

BACKGROUND OF THE INVENTION

This invention relates to a light stable polymeric laminate and method of preparation, and more particularly to a polystyrene-polymethylmethacrylate laminate formed by the interfacial bonding of a functionalized styrenic copolymer to a polymer having pendant ester groups such as polymethylmethacrylate.

General purpose polystyrene (GPPS) has optical and mechanical properties similar to polymethylmethacrylate (PMMA) when it is protected from ultraviolet light. Further, GPPS is readily thermoformable into a number of shapes. Unlike polymethylmethacrylate however, GPPS is light sensitive and undergoes photo-induced oxidative degradation at its surface. This results in a yellowing and embrittling of the polymer after prolonged exposure to ultraviolet light. Because of this sensitivity to ultraviolet light, GPPS's use for exterior applications such as insulating glazing for residential and commercial windows or other indoor or outdoor applications where it is likely to be exposed to ultraviolet light is quite limited.

Currently, the market for light stable outdoor glazing applications is dominated by acrylics such as PMMA because of its optical transparency and light stability. Polycarbonate has also found use for applications which require high impact resistance. However, the cost of acrylics is approximately twice or more than that of GPPS. Polycarbonate is also expensive.

Attempts have been made to protect polystyrene from the effects of ultraviolet light by laminating it to a light stable material such as PMMA. See, for example, "Light-Stable PS Sheet on the Way", *Plastic World.* October 1982, page 5. However, it is known that acrylics such as PMMA do not adhere to general purpose crystalline polystyrene due to their incompatibility. Without an intervening adhesive layer, a laminate of GPPS and PMMA can be easily delaminated by applying only a small external force. Use of intervening adhesive layers such as urethane or epoxy-based adhesives is possible. However, such adhesives exhibit undesirable optical properties such as opacity or haziness.

Others have used copolymers of styrene in forming laminates with acrylics. For example, Hall, U.S. Pat. No. 4,350,742, teaches bonding an acrylic film directly to poly(styrene-co-acrylic acid) (SAA). However, the SAA copolymer is even more prone to rapid ultraviolet degradation than polystyrene itself. Thus, an SAA copolymer would be poorly suited to exterior applications, even when laminated to an acrylic.

Accordingly, the need still exists in the art for a light stable, optically clear material which is less expensive than acrylics or polycarbonate. Further, the need still exists in the art for a light stable yet inexpensive low heat transfer material for residential and commercial glazing applications. Still further, the need exists in the art for a process of bonding together incompatible styrenic and acrylic polymers without the need for intervening glues or adhesives.

SUMMARY OF THE INVENTION

The present invention meets those needs by providing a light-stable, optically clear laminate construction and method of making it which utilizes inexpensive styrenic polymers laminated to polymers containing pendant esters groups such as acrylic polymers. The laminate formed exhibits strong interfacial adhesion without the need for additional glue or adhesive layers through the use of pendant functionalized hydroxyl groups incorporated into the styrenic polymer by copolymerization. These pendant hydroxyl groups react with active ester groups on the other polymer layer in the laminate to form strong covalent interfacial bonds. Further, the laminate produced is thermoformable.

In accordance with one aspect of the present invention, a method of forming a light-stable laminate by bonding layers of incompatible polymers without the use of adhesives is provided and includes the steps of copolymerizing a styrenic monomer and from about 1 to about 10% by weight of a reactive comonomer which contains a hydroxyl moiety or a precursor to a hydroxyl moiety to form a copolymer layer having pendant hydroxy-functional groups. Examples of suitable comonomers include, but are not limited to hydroxyethylacrylate, hydroxyethylmethacrylate, hydroxybutylmethacrylate, and mixtures thereof. By a "precursor to a hydroxyl moiety," we mean a pendant moiety which can be prereacted to contain a hydroxyl group.

The copolymer layer is then bonded to a polymer layer containing pendant ester groups by heating the layers, preferably either in a compression molding step or during coextrusion of the layers. Suitable polymers containing pendant ester groups include, but are not limited to, polymers of acrylic and methacrylic acid such as polymethylmethacrylate. Optionally, the laminate formed by this process may then be mechanically strengthened by biaxially stretching it.

In a preferred embodiment, the copolymerization is carried out in the presence of a catalyst such as benzoyl peroxide. The copolymerization is also preferably carried out at temperatures of from between about 80 to about 125° C. for a time sufficient for the polymerization to take place, typically 24 to 48 hours.

The interfacial bonding step can be accomplished through the application of heat which causes the pendant hydroxy-functional groups on the styrenic copolymer to react with corresponding active ester groups on the preferred acrylic polymer layer and bond together. Preferred means for bonding include compression molding the layers together under heat and pressure or coextruding the layers from a common die.

In another embodiment of the invention, a method of forming a light-stable laminate by bonding layers of incompatible polymers without the use of adhesives is provided including the steps of copolymerizing a styrenic monomer and from about 1 to about 10% by weight of a reactive comonomer comprising a hydroxy-functional alkyl ester of acrylic or methacrylic acid, to form a copolymer layer having pendant hydroxy-functional groups. The copolymer layer is then bonded to a polymer layer containing pendant ester groups, preferably a polymethylmethacrylate layer, by heating the layers.

The present invention is also directed to a light-stable laminate construction which includes a first layer comprising a copolymer of a styrenic monomer and from about 1 to about 10% by weight of a reactive comonomer comprising a hydroxy-functional alkyl ester of acrylic or methacrylic acid, to form the first layer having pendant hydroxy-functional groups, and bonded to the first copolymer layer a second layer of a polymer containing pendant ester groups such as polymethylmethacrylate. In a preferred embodiment, a three layer laminate is produced by bonding the first layer between layers of polymethylmethacrylate. In this manner, the light sensitive styrenic copolymer is protected between layers of a light stable acrylic resin. Where light stability is critical, preferably, the layers of polymethylmethacrylate are between about 5 and about 20 mils thick to provide adequate protection from ultraviolet light.

In another embodiment of the invention, a five layer light-stable laminate construction is provided which includes a core layer of polystyrene having two major surfaces. Bonded to each major surface of the core layer are copolymer layers comprising a copolymer of a styrenic monomer and from about 1 to about 10% by weight of a reactive comonomer comprising a hydroxy-functional alkyl ester of acrylic or methacrylic acid, to form the copolymer layers having pendant hydroxy-functional groups. Further, bonded to each of the copolymer layers is a second layer of a polymer containing pendant ester groups such as polymethylmethacrylate. Preferably, the layers of polymethylmethacrylate are between about 5 and about 20 mils thick to provide adequate protection from ultraviolet light.

The light stable laminate construction provides an inexpensive alternative to prior art materials, eliminates the need for additional glue or adhesive layers which may adversely affect the optical and processing qualities of the polymers, and provides a low heat transfer construction for insulating glazing applications in residential and commercial buildings. Because no additional glue layers are required, the need to match the viscosity of the glue layers with those of the polymers during coextrusion to fabricate the laminate is eliminated. Additionally, the need to match the viscosity of the glue layers with those of the polymers during thermoforming of the laminate is also eliminated, and the absence of any glue layers simplifies fabrication.

Further, because of the good optical qualities of the laminate, it may be used in multilayer laminates for optical interference films and reflective polymeric bodies. The process of the present invention permits the fabrication of multilayer thin films or coextruded microlayer films or sheets with controllable interfacial adhesion which allows greater processing flexibility and control of end use properties.

Accordingly, it is an object of the present invention to provide a light stable, optically clear material which is less expensive than acrylics or polycarbonate and which exhibits low heat transfer properties for residential and commercial glazing applications. Further, it is an object of the present invention to provide a laminate of styrenic and acrylic polymers having strong interfacial adhesion without the need for additional glue or adhesive layers. These, and other objects and advantages of the present invention, will become apparent from the following detailed description, the accompanying drawings, and the appended claims.

BRIEF DESCRIPTION OF THE DRAWINGS

FIG. 1 is a graph of torque versus mixing time for polymethylmethacrylate melt blended at 190° C.;

FIG. 2 is a graph of torque versus mixing time for poly(styrene-co-5 weight % HEMA) melt blended at 190° C.;

DETAILED DESCRIPTION OF THE PREFERRED EMBODIMENTS

Figure 3:
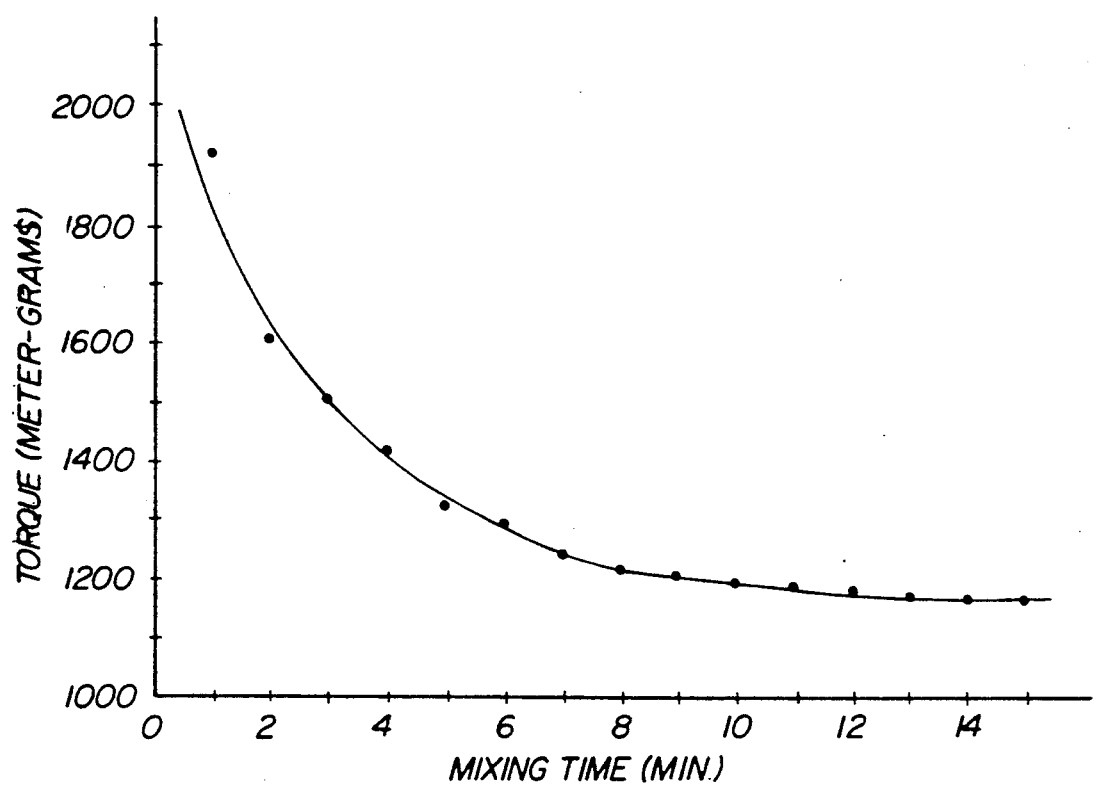
FIG. 3 is a graph of torque versus mixing time for a 60/40 by weight mixture of PMMA and polystyrene melt blended at 190° C.

The present invention provides for a light stable, optically clear laminate of incompatible styrenic and acrylic polymers wherein the layers in the laminate are chemically bonded together at their interfacial surfaces. The bonds are formed by employing a functionalized styrenic copolymer having pendant hydroxy-functional groups, which bond, under applied heat, to coreactive ester groups on the surface of the acrylic polymer layer.

As used herein, the term "styrenic monomer" means styrene and alkenyl aromatic monomers including alkyl styrenes and halogenated styrenes, as well as combinations of styrene with minor amounts of coreactive monomers such as, for example, acrylonitrile, alkyl alcohols, and vinyl acetate. Likewise, the terms "styrenic polymer" and "styrenic copolymer" are intended to mean polymers and copolymers of the above-identified monomers.

Reactive hydroxy-functional groups may be introduced into the styrenic polymers of the present invention by copolymerizing a styrenic monomer with a sufficient amount of a reactive comonomer. These hydroxyl-functional groups then form covalent bonds with coreactive ester groups on the other polymer layer to chemically bond the two polymers together. Preferably, from about 1 to about 10% by weight of a reactive comonomer having a hydroxyl moiety or a precursor for a hydroxyl moiety is used. Such a comonomer may be preferably selected from the group consisting of hydroxyethylacrylate, hydroxyethylmethacrylate, hydroxybutylmethacrylate, and mixtures thereof.

The interfacial reaction which takes place is a condensation reaction, shown by equation I below, at the pendant hydroxy-functional sites on the polystyrene and at the coreactive ester sites on, for example, the polymethylmethacrylate to form the covalent bonds.

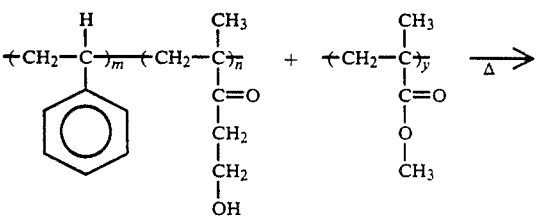

-continued

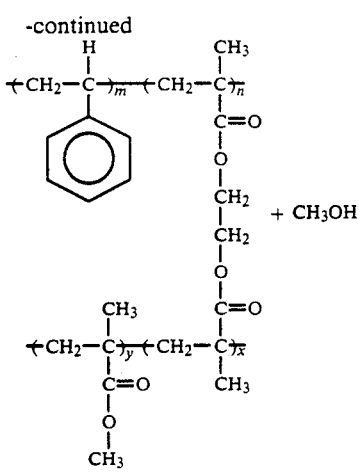

The weight percentages of reactive comonomer may be varied to control the amount of interfacial adhesion achieved. That is, a large number of pendant hydroxy-functional reactive sites on the styrenic polymer will react to form a tenacious and very strong bond, whereas the use of only a small amount of the coreactive monomer will produce a lesser number of reaction sites and a correspondingly lesser degree of adhesion between the layers. By varying the degree of adhesion obtained, one skilled in the art may be able to influence the mechanical properties of the laminate such as impact strength, tensile strength, and ductility.

The laminates fabricated by the practice of the present invention will have improved mechanical properties over acrylics like polymethylmethacrylate alone if they are axially oriented. Unlike polystyrene, polymethylmethacrylate is difficult to orient. However, the laminate of the present invention includes a styrenic component layer that can be oriented, preferably biaxially, to improve its toughness and tensile and impact strengths.

The copolymerization of the styrenic monomer and hydroxy-functional acrylates is preferably carried out in the presence of a catalyst such as benzoyl peroxide. The copolymerization is also preferably carried out in two stages by blending the liquid monomers together and heating at about 80° C. for a period of from 24 to 48 hours followed by a further heating step at about 125° C. for an additional 24 hours.

The laminate construction of the present invention may comprise two, three, or multiple layers. Where the laminate is to be used for exterior applications where it will be exposed to ultraviolet light, such as for exterior insulating glazing applications, a three or five layer laminate is preferred with the polymethylmethacrylate forming protective outer layers in the laminate. For example, a preferred three layer laminate is produced by bonding the first layer of functionalized polystyrene between layers of polynethylmethacrylate. In this manner, the light sensitive styrenic copolymer is protected between layers of light stable acrylic. Preferably, the layers of polymethylmethacrylate are between about 5 and about 20 mils thick. The functionalized polystyrene layer may be of any useful thickness desired.

In another embodiment, a five layer light-stable laminate construction may be fabricated which includes a core layer of polystyrene having two major surfaces. Bonded to each major surface of the core layer are copolymer layers comprising the functionalized polystyrene having pendant hydroxy-functional groups. Further, bonded to each of the copolymer layers is a second layer of polymethylmethacrylate. Preferably, the layers of polymethylmethacrylate are between about 5 and about 20 mils thick. The polystyrene and functionalized polystyrene layers may be of any useful thickness desired.

The laminates of the present invention may be formed in a number of ways which insure that heat is applied to the respective layers to cause the interfacial reaction to occur. One preferred method is to compression mold the layers using heat and pressure to cause the bonding to take place. Another preferred method is coextrusion of the polystyrene functionalized copolymer in tandem with the polymethylmethacrylate. The heat of the polymer streams issuing from the extrusion die and the contacting of the layers at their interfacial surfaces is sufficient to result in the bonding reaction to take place and covalently bond the two polymers together. The coextrusion operation may be repeated to add additional layers, or a multilayer coextrusion die may be used.

Further, the process of the present invention is particularly adapted to microlayer coextrusion using multilayered coextrusion devices as described in U.S. Pat. Nos. 3,773,882 and 3,884,606 the disclosures of which are incorporated herein by reference. Such a device provides a method for preparing multilayered, simultaneously extruded thermoplastic materials, each of which are of a substantially uniform layer thickness. Preferably, a series of layer multiplying means as are described in U.S. Pat. No. 3,759,647 the disclosure of which is incorporated herein by reference may be employed.

The feedblock of the coextrusion device receives streams of the diverse thermoplastic polymeric materials from a source such as a heat plastifying extruder. The streams of resinous materials are passed to a mechanical manipulating section within the feedblock. This section serves to rearrange the original streams into a multilayered stream having the number of layers desired in the final body. Optionally, this multilayered stream may be subsequently passed through a series of layer multiplying means in order to further increase the number of layers in the final body.

The multilayered stream is then passed into an extrusion die which is so constructed and arranged that streamlined flow is maintained therein. Such an extrusion device is described in U.S. Pat. No. 3,557,265, the disclosure of which is incorporated by reference herein. The resultant product is extruded to form a multilayered body in which each layer is generally parallel to the major surface of adjacent layers.

In order that the invention may be more readily understood, reference is made to the following examples, which are intended to illustrate the invention, but are not to be taken as limiting the scope thereof.

EXAMPLE 1

A polystyrene having pendant functionalized hydroxyl groups was synthesized by copolymerization of styrene with hydroxyethylmethacrylate (HEMA). Styrene (95 pph by weight), HEMA (5 pph) and benzoylperoxide (0.2 pph) were mixed together and polymerized in two steps (80° C. for 48 hours, 125° C. for 24 hours). The liquid monomers polymerized to a glassy, transparent polymer (poly(styrene-co-HEMA)).

Other polymers used in this example were polymethylmethacrylate (PMMA) (purchased from Rohm and Haas Chemical Company under the designation Plexiglas V811) and general purpose polystyrene (from the Dow Chemical Company under the designation STYRON 685D). The polymers were blended in a Plasti-Corder Brabender device at 190° C. at 60 rpm. The change in viscosity (inferred from torque data reported in the drawing figures) was used to determine possible polymer reactions.

FIG. 1 shows the torque data for PMMA melt blended at 190° C.; FIG. 2 is for poly(styrene-co-HEMA); FIG. 3 is the torque data for blending a 60/40 (w/w) mixture of PMMA with general purpose polystyrene (STYRON 685D). In each case, the torque did not increase during the blending process. This indicates that PMMA and PS-HEMA do not crosslink and also that PMMA does not react with general purposes polystyrene under those conditions.

Figure 4:
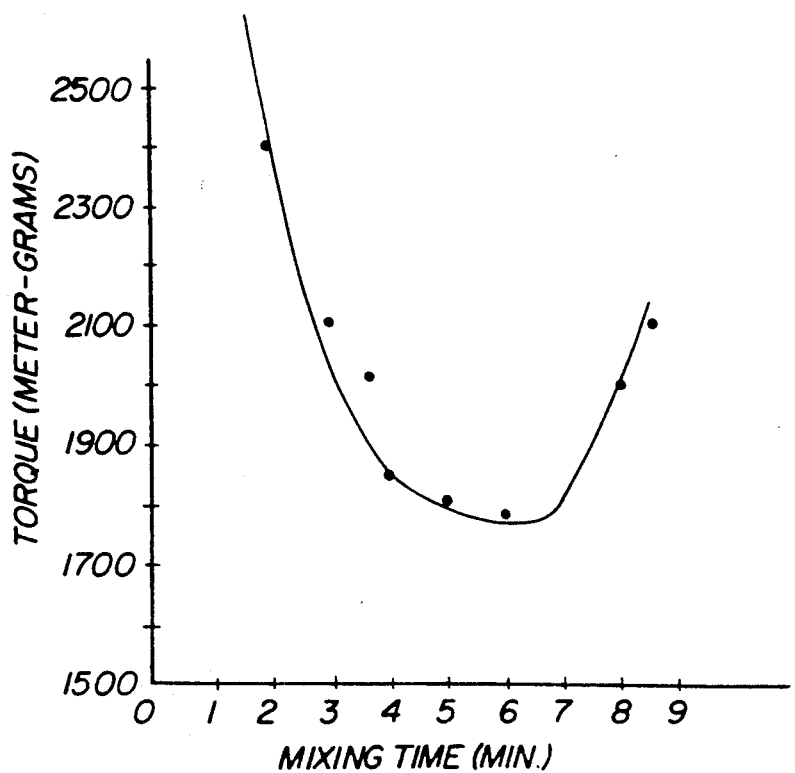
FIG. 4 is a graph of torque versus mixing time for a 60/40 by weight mixture of PMMA and poly(styrene-co-5 weight % HEMA) melt blended at 190° C.

When a mixture of 60/40 (w/w) PMMA and poly(styrene-co-HEMA) was melt mixed together (at 190° C.), the torque increased significantly at 6 minutes of mixing time (see FIG. 4). This result indicates that PMMA is reacting with poly(styrene-co-HEMA) in the melt to form a covalently-bonded, crosslinked polymer, as described in the following reaction equation:

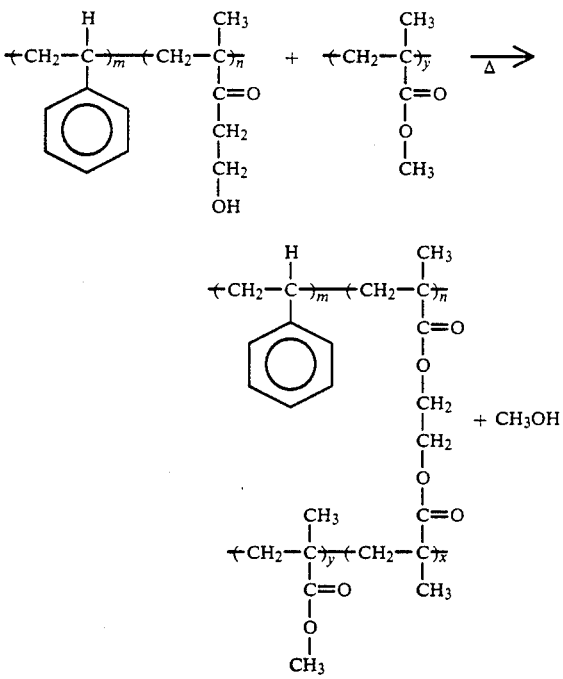

EXAMPLE 2

Poly(styrene-co-HEMA), a crystal clear styrene copolymer, was prepared by copolymerization of styrene and HEMA as described in Example 1. Compression molded sheets (4"×6"×0.015") of poly(styrene-co-HEMA) and PMMA were pressed together in a compression molding machine at 190° C. (chase size: 4"×6"×0.030"; cycle time: 2 min preheating, 5 min. curing and 5 min. cooling at 40,000 psi of drum pressure). The resulting two layer laminate was tested for adhesion by applying a sharp razor blade at the PMMA/poly(styrene-co-HEMA) interface. The results, as a function of HEMA content, are summarized in Table I below.

TABLE I

Razor Blade Peel Test Results for PMMA/Poly(styrene-co-HEMA) Laminates

| Sample | Wt % of HEMA in Pol(styrene-co-HEMA) | Razor Blade Peel Test Results |
|---|---|---|
| 1 | 0 (STYRON 685D) | The two layers fell apart, no adhesion |
| 2 | 1 | The two layers can be easily separated by a razor blade |
| 3 | 2.5 | The two layers can be separated by razor blade, but with difficulty |
| 4 | 5 | The two layers could not be separated by any means |

The strong interfacial adhesion strength between PMMA and poly(styrene-co-HEMA) is believed to be due to the interfacial chemical reaction described in Example 1.

A copolymer of styrene with 5 wt % of hydroxyethylacrylate (HEA) was also prepared. When hot pressed together with PMMA under the conditions described above, an inseparable 2-layer laminate was obtained.

EXAMPLE 3

Three-layer PMMA/poly(styrene-co-HEMA)/PMMA laminates were fabricated by coextrusion. The extrusion line included first and second extruders each having a ⅜" diameter screw, a length to diameter ratio of 15, two temperature control zones, and a compression ratio of 2.5. A 20 lb/hr feedblock coextrusion die was used having a die width of 2" and a die gap of 0.080".

The first extruder contained PMMA(Plexiglas V811) and was operated at 45 rpm to provide a discharge pressure of 5500 psi. Both temperature control zones were operated at 430° F. The second extruder contained poly(styrene-co-HEMA) (5%) as prepared in Example 1 and was operated at 25 rpm to provide a discharge pressure of 2000 psi. The first temperature control zone was operated at 300° F., while the second zone was operated at 450° F. The feedblock coextrusion die was maintained at 450° F., and at an extrusion rate of 6 lb/hr.

The three-layer PMMA/poly(styrene-co-HEMA)/PMMA laminates (25%/50%/25% by volume) were found to have excellent interfacial adhesion at the polymer interfaces.

EXAMPLE 4

A five layer PMMA/poly(styrene-co-HEMA (5%)/polystyrene/poly(styrene-co-HEMA (5%)/PMMA laminate was fabricated by coextrusion. The extrusion line included first, second, and third extruders having 1.5", 0.75", and 1.25" diameter screws respectively. A five-layer feedblock coextrusion die was used having a die width of 5" and a die gap of 0.125".

The first extruder contained PMMA and was operated at 11 rpm. The feed zone was maintained at 400° F., while the remaining four temperature control zones were operated at 450° F. The second extruder contained poly(styrene-co-HEMA) (5%) as prepared in Example 1 and was operated at 20 rpm. The two temperature control zones were both maintained at 400° F. The third extruder contained polystyrene and was operated at 100 rpm. The three temperature control zones were maintained at 380° F. The five-layer feedblock coextrusion die was maintained at 450° F. After coextrusion, the five layer laminate was passed between polishing rolls heated to 230° F.

The five-layer PMMA/poly(styrene-co-HEMA)/Polystyrene/poly(styrene-co-HEMA)/PMMA laminate (13.5%/2.5%/68%/2.5%/13.5% by volume) was found to have excellent interfacial adhesion at the polymer interfaces. The PMMA layer could be partially delaminated with a razor blade. Optical microscopy indicated that the delamination occurred at the PMMA/PS-co-HEMA interface. The PS-co-HEMA layer could not be delaminated from PS by any means.

EXAMPLE 5

The light stability of PMMA and the other styrenic polymers used in this invention were measured. Various thicknesses of 2"×2" samples were placed on aluminum foil and put 12" from a high intensity UV-light source (GE275W Sunlamp) in open air at room temperature. The samples were exposed for various periods of time. ASTM-D1925 test method was used to measure the yellowish index of the samples.

Table II summarizes the yellowish index results. A greater value for yellowish index indicates a more yellow sample. The yellowing of the sample is a consequence of photo-induced oxidative degradation of the polymer. PMMA has excellent light stability. The yellowish index only changed slightly over a period of 264 hours of UV exposure. The light stabilities of GPPS, and functionalized polystyrenes with pendant hydroxy groups (copolymers of styrene with 5 wt % HEMA; PS-HEMA), are relatively similar. Poly(styrene-co-3 wt % acrylic acid), however, degraded more rapidly when exposed to the sunlamp. After 168 hours of exposure, this polymer became dark brown in color and was too brittle to be tested for mechanical properties.

The light stability of the 3-layer PMMA/GPPS/PMMA and PMMA/PS-HEMA/PMMA laminates are significantly better than that of GPPS or PS-HEMA. A 5 mil layer of PMMA coated on the GPPS surface significantly inhibits photo-induced oxidative degradation (see sample 6). However, the 3-layer PMMA/GPPA/PMMA laminate can be easily separated and is not expected to have any practical utility. The 3-layer PMMA/PS-HEMA/PMMA laminate has enhanced light stability and excellent interfacial adhesion.

TABLE II

Yellowish Index of Polymer Samples After Exposure to a GE-275 W Sunlamp

| Samples | Yellowish Index (ASTM D1925) Of Samples After Exposure to UV Light for (hours): | | | | | | |
|---|---|---|---|---|---|---|---|
| | 0 | 72 | 96 | 168 | 176 | 240 | 264 |
| 1) General Purpose Polystyrene (GPPS), 29 mil | +1.1 | | +4.2 | | +8.2 | | +14.8 |
| 2) Polymethylmethacrylate (PMMA), 19 mil | +0.8 | | +0.9 | | +1.3 | | +1.7 |
| 3) Polymethylmethacrylate (PMMA), 31 mil | +0.8 | | +0.9 | | | | |
| 4) Poly(styrene-co-5% HEMA) (PS-HEMA), 20 mil | +1.1 | | +4.4 | | +6.7 | | +8.1 |
| 5) Poly(styrene-co-3% acrylic acid) (PS-AA) 34 mil | +1.8 | | | +26.1 | | | |
| 6) PMMA/GPPS/PMMA, 5/29/5 mil | +1.1 | | +2.5 | | +3.6 | | +3.9 |
| 7) PMMA/PS-HEMA/PMMA, 11/33/11 mil | +1.2 | +2.5 | | | | +3.0 | |
| 8) PMMA/PS-HEMA/PMMA, 13/14/13 mil | +1.3 | | +2.8 | | +2.6 | | +3.0 |

EXAMPLE 6

This example further demonstrates the surface protection effect of PMMA on polystyrene. A PMMA/GPPS/PMMA (2"×2"×0.039" thick) laminate sheet comprised of two 0.013" PMMA layers and one 0.013" GPPS inner layer was exposed to a GE-275W Sunlamp for 400 hours as described previously. A sample (2"×2"×0.013" thick) of GPPS was also exposed to the sunlamp under identical conditions. After exposure, the sample was measured for yellowish index. Subsequently, the individual layers in the three layer PMMA/GPPS/PMMA sheet were separated and individually measured for yellowish index. Table III summarizes the results.

TABLE III

Yellowish Index of GPPS and 3-Layer PMMA/GPPS/PMMA After Exposure to a GE-275W Sunlamp for 400 Hours

| Samples | 0 hr | 400 hr |
|---|---|---|
| GPPS (13 mil) | +1.1 | +18.5 |
| PMMA/GPPS/PMMA (13/13/13 mils) | +1.1 | +3.5 |
| PMMA Layers on the 3-layer Laminates After Being Separated | +0.8 | +2.0 (Layer that faced the lamp) |
| | +0.8 | +1.2 (bottom layer) |
| Center GPPS Layer in the 3-layer Laminate | +1.1 | +1.3 |

This example demonstrates that GPPS, when protected by PMMA, shows no yellowing after a long-term UV exposure. Without the protective PMMA layers, the GPPS became severely discolored.

EXAMPLE 7

The tensile properties of a 0.044" thick, 3-layer PMMA/poly(styrene-co-HEMA)/PMMA sample were compared with that of a 0.045" thick GPPS sample. The two samples were first exposed to UV light as described previously; then the tensile properties were evaluated. Table IV summarizes the results.

TABLE IV

Tensile Properties and Yellowing Index of Coextruded PMMA/PS-HEMA Samples

| Sample | 0 hr | 72 hr | % Change | 168 hr | % Change |
|---|---|---|---|---|---|
| STYRON 685D (45 mil) | d: 6590 psi<br>$e_b$: 4.27%<br>YI: +1.1 | 4110 psi<br>2.15%<br>+4.2 | (−38%)<br>(−50%) | Too brittle to test<br><br>+7.5 | |
| Coextruded 11/22/11 mil PMMA/PS-HEMA/ PMMA | d: 7463 psi<br>$e_b$: 5.5%<br>YI: +1.2 | 7309 psi<br>4.38%<br>+1.8 | (−2%)<br>(−20%) | 8130 psi<br>4.92%<br>+2.5 | (+9%)<br>(−8%) |

*2" × 0.405" tensile bars, average of five test samples.

The tensile strength of unprotected GPPS was significantly decreased after 72 hours of UV exposure. In contrast, the 3-layer PMMA/poly(styrene-co-HEMA)/PMMA laminate did not suffer a loss of tensile strength, even up to 168 hours of exposure.

EXAMPLE 8

A coextruded 55 mil thick PMMA/poly(styrene-co-HEMA)/PMMA laminate comprised of two 11 mil thick PMMA skin layers and a 33 mil thick poly(styrene-co-5 wt % HEMA) inner layer was exposed to UV light as described previously. The impact strength of the sample (measured by a Dynatup Impact Tester) before exposure was 3.24±0.48 in-lb/55 mil. The sample's impact strength was essentially unchanged (3.96±0.060 in-lb/55 mil) after exposure to UV light for 72 hours.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A light-stable laminate construction comprising, a first layer comprising a copolymer of a styrenic monomer and from about 1 to about 10% by weight of a reactive comonomer having a hydroxyl moiety or a precursor for a hydroxyl moiety, to form said first layer having pendant hydroxy-functional groups, and a second layer of a polymer having pendant ester groups, wherein said pendant hydroxy-functional groups of said first layer react with said pendant ester groups of said second layer to form covalent bonds between said first and second layers.

2. The light-stable laminate construction of claim 1 in which said reactive comonomer comprises a hydroxyl-functional alkyl ester of acrylic or methacrylic acid.

3. The light-stable laminate construction of claim 1 in which said polymer having pendant ester groups is polymethylmethacrylate.

4. The laminate of claim 3 in which said first layer is bonded between layers of polymethylmethacrylate.

5. The laminate of claim 4 in which said layers of polymethylmethacrylate are between about 5 and about 20 mils thick.

6. A light stable laminate construction comprising, a core layer of polystyrene having two major surfaces, bonded to each major surface of said core layer, copolymer layers comprising a copolymer of a styrenic monomer and from about 1 to about 10% by weight of a reactive comonomer having a hydroxyl moiety or a precursor for a hydroxyl moiety, to form said copolymer layers having pendant hydroxy-functional groups, and a second layer of a polymer having pendant ester groups, wherein said pendant hydroxy-functional groups of said copolymer layers react with said pendant ester groups of said second layer to form covalent bonds between said copolymer layers and said second layer.

7. The light stable laminate construction of claim 6 in which said reactive comonomer comprises a hydroxyl-functional alkyl ester of acrylic or methacrylic acid.

8. The light-stable laminate construction of claim 6 in which said polymer having pendant ester groups is polymethylmethacrylate.

9. The laminate of claim 8 in which said layers of polymethylmethacrylate are between about 5 and about 20 mils thick.

* * * * *